United States Patent [19]
Kondis et al.

[11] 3,781,177
[45] Dec. 25, 1973

[54] ISOSTEARIC ACID COATED, NON-DUSTING ALUMINUM PARTICLES

[75] Inventors: Thomas J. Kondis, Pittsburgh; Rolf Rolles, New Kensington, both of Pa.

[73] Assignee: Aluminum Company of America, Pittsburgh, Pa.

[22] Filed: Apr. 26, 1973

[21] Appl. No.: 354,801

Related U.S. Application Data

[63] Continuation-in-part of Ser. No. 249,112, May 1, 1972, abandoned.

[52] U.S. Cl. ............... 149/6, 117/100 M, 149/46
[51] Int. Cl. ........................................... C06b 19/02
[58] Field of Search ............... 149/6, 87, 46, , 149/249, 112; 117/100 M

[56] References Cited
UNITED STATES PATENTS

| | | | |
|---|---|---|---|
| 3,151,009 | 9/1964 | Toulmin | 149/6 |
| 3,249,474 | 5/1966 | Clay et al. | 149/6 |
| 3,297,502 | 1/1967 | Chrisp | 149/6 |
| 3,367,805 | 2/1968 | Clay et al. | 149/6 |

OTHER PUBLICATIONS

Rose et al., The Condensed Chemical Dictionary, 7th Ed., p. 527, Reinhold Publishing Corporation (1966) New York QD5 C5 1966

*Primary Examiner*—Leland A. Sebastian
*Assistant Examiner*—E. A. Miller
*Attorney*—Carl R. Lippert

[57] ABSTRACT

Aluminum powder coated with isostearic acid exhibits substantially no dusting during handling thereby enhancing safety and environmental aspects.

8 Claims, No Drawings

ISOSTEARIC ACID COATED, NON-DUSTING ALUMINUM PARTICLES

This is a continuation-in-part of U. S. Ser. No. 249,112, filed May 1, 1972 now abandoned.

BACKGROUND OF THE INVENTION

Fine aluminum particulates have proven to be useful in many commercial applications, including use as a fuel in aqueous slurry explosives. One disadvantage usually associated with the fine particle sizes in some propensity to dust during handling whereby very fine particles disperse themselves in the atmosphere. This dusting is undesirable for a number of obvious reasons. It present cleanliness problems and represents an uneconomical loss of metal. More importantly, it has harmful effects of the environment and it can present health and serious explosive hazards to plant and other personnel.

As indicated above, aluminum powders can be used in aqueous slurry explosive systems and one such system favors providing the particles with a lyophobic or hydrophobic coating which controls their surface activity as disclosed in U.S. Pat. No. 3,249,474 to Robert B. Clay et al. This patent discloses various specific formulations for the coating including normally solid fatty acids such as stearic acid and palmitic acid and their derivatives such as calcium stearate and stearamide, together with gilsonite, high melting point waxes, asphaltic materials, finely divided polyolefins such as polyethylene and polypropylene, silicone greases and the like, and mixtures thereof. However, while these coatings perform their intended purpose to varying extents, they all leave the dusting problem unsolved in that the coated particles still exhibit their undesirable dusting property.

DETAILED DESCRIPTION

It has been found that coating aluminum particlulates with selected amounts of isostearic acid, quite surprisingly, will not only produce the desired hydrophobic surface, but in addition, renders the particles substantially non-dusting.

In this description reference is made to aluminum particulates or particulate aluminum, which is intended to encompass all finely divided powders regardless of their source. Included are atomized powders which are formed by injecting a spray of molten aluminum into a relatively cool atmosphere. Also included are aluminum flakes which are produced by further subdividing atomized powder as in a ball mill, chopped foil products which are formed by chopping scrap or waste foil, and waste machine products such as borings and turnings. Of particulular concern are those aluminum particriculates, especially those of the atomized variety, which will pass through a 325 mesh screen of the Tyler Standard Screen Sieve Series. Generally speaking, it has been found that the major dusting problems which occur during the handling of aluminum powders are caused by these relatively fine particles. It is to be understood, however, that all aluminum particles, regardless of their size, which have a tendency to dust, will be substantially benenefited by the use of this invention. Some useful embodiments of the invention employ aluminum powders containing as little as 10 percent or even less of $-325$ mesh particulates while others may employ 50 percent or more of $-325$ mesh particulates.

The amount of the coating is, generally speaking, 0.1 to 5 percent based on the weight of the aluminum particles. Where the particulate aluminum consists in part of $-325$ mesh particulates, this amount of isostearic acid coating is sufficient to substantially prevent dusting. It is believed that 90 percent or more of the aluminum surfaces in the powder are coated without substantial difficulty, and thereby provide a sufficient degree of agglomeration of the particles to prevent the dusting. The amount of coating within the 0.1 to 5 percent range generally increases as the amount of $-325$ mesh particulates increases. In one preferred embodiment, where 10 to 100 percent $-325$ mesh particulates are present we have found 0.2 to 5 percent isostearic acid sufficient to substantially prevent the dusting. However, heavier coatings of up to 10 percent isostearic acid may be employed but usually on a less preferred basis since as the amount exceeds 5 percent the resulting mixture becomes increasingly too wet, sluggish and difficult to hande. If less than 0.10 percent isostearic acid is used dusting may not be sufficiently retarded.

The term isostearic acid as used herein is not intended to be restricted to its literal translation of 16-methylheptadecanoic acid but rather is intended in its more common meaning as is normally associated with a coined name, in this case for mixtures of $C_{18}$ saturated fatty acids of the general formula $C_{17}H_{35}OOH$. These are rather complex mixtures of isomers, liquid at room temperature and primarily of the methyl-branched series, which are mutually soluble and virtually inseparable. While most of the branched chain contain a total of 18 carbon atoms, not necessarily all of the molecules contain exactly that number. The branch is primarily methyl but may possibly include some ethyl and the distribution is typically primarily towards the center of the chain but is still farily random. Methods pertaining to the production of isostearic acid are contained in U.S. Pat. Nos. 2,664,429 and 2,812,342. One source of isostearic acid suitable in practicing the invention is marketed commercially by Emery Industries, Inc. under the trade name Emery 871 Isostearic Acid. Typical characteristics of this acid are listed in the following table.

| | |
|---|---|
| Titer, °C max. | 10 |
| Iodine Value, max. | 10 |
| Free Fatty Acid, % (as oleic) | 88 |
| Acid Value | 175 |
| Saponification Value, min. | 180 |
| Molecular Weight (approx.) | 284 |
| Refractive Index, 25°C | 1.4603 |
| Viscosity, cps., 25°C | 48 |

The non-dusting powder described herein can be produced quite economically by blending or mixing, employing more or less conventional means, the particulate aluminum with the appropriate amount of isostearic acid thereby applying to the particulate surfaces a coating of isostearic acid. Double cone mixers, rotating disc mixers and ribbon blenders have all been employed with satisfactory results. This may be done at room temperature, which is preferred, or at a higher temperature if more convenient.

The advantage of using isostearic acid, a liquid at room temperature, as opposed to other long chain fatty acids or their derivatives, such as stearic acid and the like, which will induce artificial hydrophobic properties, is most surprising. True enough, isostearic acid is structurally similar to stearic acid and both share the hydrophobic coating property often desired in aluminum fuel aqueous slurry explosives. However, stearic acid and other solid fatty acids, when applied to particulate aluminum, generally do not prevent the dusting of the particles. The prior art coatings of stearic acid were of the normal stearic acid structure, a solid at room temperature, since it provides the desired hydrophobic coating but is somewhat less expensive, presently around one-half as costly, as isostearic acid.

The invention will be more fully appreciated by reference to the following specific examples.

EXAMPLE 1

Atomized aluminum powder commercially classified as Grade 120, having a nomial size wherein 100 percent passed through a 40 mesh sieve and 40 percent passed through a 325 mesh sieve, was coated with 0.125 percent isostearic acid by blending the aluminum powder with the iostearic acid at room temperature in a tumbler. The resulting powder exhibited substantially no dusting.

EXAMPLE 2

The same powder as in Example 1 was coated in the manner described in Example 1 with 2 percent stearic acid. Even with this amount of coating the powder dusted freely.

EXAMPLE 3

Atomized aluminum powder commercially classified as Grade 123, having a nominal size wherein 100 percent passed through a 200 mesh sieve and 93 percent passed through a 325 mesh sieve, was coated with 3 percent isostearic acid by blending the aluminum powder with the isostearic acid at room temperature in a tumbler. The resulting powder exhibited no dusting.

EXAMPLE 4

The same powder as in Example 3 was coated in the manner described in Example 3 with 0.5 percent isostearic acid. Even with such a small percentage of coating, the powder was rendered substantially non-dusting.

EXAMPLE 5

The same powder as in Example 3 was coated in the manner described in Example 3 with 5 percent stearic acid. This product exhibited dusting.

EXAMPLE 6

The same powder as in Example 3 was coated in the manner described in Example 3 with 10 percent stearic acid. Even with this amount of coating the powder still dusted freely.

EXAMPLE 7

An important characteristic of coated aluminum powder which is used in the explosive industries is the ability of the powders to withstand exposure to water or moisutre without excess reaction between the aluminum and aqueous phases. The aluminum-water reaction produces hydrogen, an obviously dangerous commodity, and also depletes aluminum. A dominant practice in using water slurry explosives is to first combine aluminum with water and store the aluminum-water slurry for a period of time before combination with ammonium nitrate and the other constituents of the explosives which are blended together a short time prior to pouring and detonation. Obviously the aluminum should be capable of withstanding sustained exposure to water or moisture without degradation or consumption of the aluminum and evolution of hydrogen. Coatings of stearic acid are known to be useful for this purpose although oleic and other unsaturated acids are far less suited as is widely recognized.

One test to determine the stabilizing effect of a coating contemplates adding 1 gram of the coated powder to a 20 percent aqueous solution of ammonium nitrate having a pH of approximately 5.5. This mixture is heated to 200°F and held there for 6 hours and the hydrogen gas evolved is collected and measured. The test system includes condensing equipment to reflux steam evolving from the test bath so that the gas measured is strictly non-condensable (or hydrogen). To illustrate the incapability of oleic acid to provide the desired protection or stability, aluminum pigment grade powder coated with 2 percent oleic acid emits 56 ml of gas which corrolates with very low stability. The same pigment powder coated with stearic acid amounting to 2 percent of the weight of the powder in the same test consistently produces less than 1 ml of gas, and usually no measurable gas, which corrolates with substantially complete stability.

Using a double cone mixer atomized aluminum powder was coated with ¼ percent stearic acid and another like batch of power coated with ¼ percent isostearic acid. The two powders were compared for stability in the presence of water in the test just discussed. The stearic acid coated powder emitted 2.6 ml of gas whereas the isostearic acid coated powder emitted 0.01 ml of gas. Uncoated atomized powder of the same grade emitted 9–10 ml of gas. The comparison test indicates that substantial reactivity remains in powder coated with stearic acid in contrast with powder coated with isostearic acid in the very small (1/4%) coating amounts used in this comparison. Larger amounts, 1½ or 2 percent, of stearic acid coating would reduce the 2.6 ml figure to the 0.0 ml level of the isostearic acid. Also more intricate or sophisticated coating techniques could also improve the performance of stearic acid in lesser amounts. When balanced against the cost of additional stearic acid these more sophisticated coating approaches lose out in favor of simply employing a larger amount of stearic acid.

Accordingly present improvement offers advantages in economics over the use of stearic acid in that while the initial cost per pound of isostearic acid would first appear unfavorable to that of stearic acid (it costs approximately twice as much), this apparent disadvantage is outweighed by the ability to use lesser amounts of isostearic acid in forming completely stabilizing coatings employing coating techniques adapted to large scale and economical use in a commercial operation. There is still another advantage derived from the use of isostearic acid in very small amounts as a coating on aluminum powder employed in explosives. In water slurry explosives it has to be remembered that organic material compete with aluminum for fuel value and in many formulations the presence of organic materials is preferably avoided or at least kept to a minimum. In this respect isostearic acid has an advantage even over stearic acid within the explosive slurry formulations themselves in that substantially complete stabilization of the water-aluminum reaction is achieved with consistently less coating when isostearic acid is employed thus keeping to an absolute minimum any organic material in those slurry-explosive formulations sensitive to its presence.

A most significant advantage in the invention flows from the fact that isostearic acid avoids the dusting problem which has previously plagued users of relatively fine aluminum powders which problem has been particularly troublesome in the explosives industry.

It is intended that the following claims cover all embodiments which come within the spirit and purposes of this invention.

What is claimed is:

1. Particulate aluminum in bulk characterized by being substantially non-dusting, said aluminum particulates being coated with between 0.1 to 5 percent of isostearic acid based on the weight of said aluminum particulates, said isostearic acid comprising mixtures of methyl-branched isomers and being liquid at room temperature.

2. The product according to claim 1 wherein said particulate aluminum consists of an atomized grade of aluminum.

3. Particulate aluminum in bulk according to claim 1 and consisting in part of particles capable of passing through a 325 mesh screen, and characterized by being substantially non-dusting.

4. The product according to claim 3 wherein said particulate aluminum consists of 10 to 100 percent of aluminum particles capable of passing through a 325 mesh screen, said particles being coated with between 0.2 to 5 percent of isostearic acid based on the weight of said aluminum particulates.

5. The product according to claim 3 wherein said particulate aluminum consists of an atomized grade of aluminum.

6. The product according to claim 3 wherein at least 90 percent of the total aluminum surface area is coated.

7. A method for substantially reducing the dusting of particulate aluminum in bulk which comprises coating said particulate aluminum with between 0.1 to 5 percent of isostearic acid based on the weight of said aluminum particulates.

8. A method for substantially reducing the dusting of particulate aluminum in bulk comprising aluminum particles capable of passing through a 325 mesh sieve, which comprises blending said particulate aluminum at room temperature with between 0.1 to 5 percent of isostearic acid based on the weight of said aluminum particulates, thereby to apply to surfaces of said particulates coatings of said isostearic acid.

* * * * *

UNITED STATES PATENT OFFICE
CERTIFICATE OF CORRECTION

Patent No. 3,781,177      Dated December 25, 1973

Inventor(s) Thomas J. Kondis and Rolf Rolles

It is certified that error appears in the above-identified patent and that said Letters Patent are hereby corrected as shown below:

| | |
|---|---|
| Col. 1, line 10 | Change "in" to --is--. |
| Col. 1, line 14 | Change "present" to --presents--. |
| Col. 1, line 16 | Change "of" to --on--. |
| Col. 1, line 25 | Change "coating" to --coatings--. |
| Col. 1, line 54 | Change "partriculates" to --particulates--. |
| Col. 1, line 63 | Change "benenefited" to --benefited--. |
| Col. 2, line 20 | Change "hande" to --handle--. |
| Col. 2, line 37 | Change "farily" to --fairly--. |
| Col. 3, line 15 | Change "nomial" to --nominal--. |
| Col. 3, line 19 | Change "iosteric" to --isostearic--. |
| Col. 3, line 61 | Change "moisutre" to --moisture--. |
| Col. 4, line 1 | Change "explosives" to --explosive--. |
| Col. 4, line 29 | Change "power" to --powder--. |
| Col. 4, line 62 | Change "material" to --materials--. |

UNITED STATES PATENT OFFICE
CERTIFICATE OF CORRECTION

Patent No. 3,781,177  Dated December 25, 1973

Inventor(s) Thomas J. Kondis and Rolf Rolles

It is certified that error appears in the above-identified patent and that said Letters Patent are hereby corrected as shown below:

| | |
|---|---|
| Claim 1, line 1 | After "aluminum" delete "in bulk". |
| Claim 3, line 1 | After "aluminum" delete "in bulk". |
| Claim 4, line 5 | After "of" insert --said--. |
| Claim 7, line 5 | After "particulates" insert --said isostearic acid comprising mixtures of methyl-branched isomers and being liquid at room temperature--. |
| Claim 8, line 8 | After "acid" insert --, which said isostearic acid comprises mixtures of methyl-branched isomers and is liquid at room temperature--. |

Signed and sealed this 7th day of May 1974.

(SEAL)
Attest:

EDWARD M. FLETCHER, JR.
Attesting Officer

C. MARSHALL DANN
Commissioner of Patents